No. 657,027. Patented Aug. 28, 1900.
J. MERTES.
FEED WATER HEATER.
(Application filed May 21, 1900.)
(No Model.)

Inventor:
John Mertes
By Livingston A. Thompson
Attorney

Witnesses:
Geo. W. Lavery
Edw. J. LaFaui

UNITED STATES PATENT OFFICE.

JOHN MERTES, OF MILWAUKEE, WISCONSIN.

FEED-WATER HEATER.

SPECIFICATION forming part of Letters Patent No. 657,027, dated August 28, 1900.

Application filed May 21, 1900. Serial No. 17,432. (No model.)

*To all whom it may concern:*

Be it known that I, JOHN MERTES, a citizen of the United States, and a resident of Milwaukee, in the county of Milwaukee and State of Wisconsin, have invented certain new and useful Improvements in Feed-Water Heaters, Condensers, and Purifiers; and I do hereby declare that the following is a full, clear, and exact description thereof.

My invention relates to devices for heating and purifying feed-water, its object being to provide a much simpler heater than those in general use with the greatest possible amount of heating-surface and perfect filtration, and also to overcome the principal defect in feed-water heaters now in use by devising one with all its parts accessible, so that it may be thoroughly and readily cleaned; and it consists in certain peculiarities of construction and combination of parts, as will be fully set forth hereinafter and subsequently claimed.

Figure 1:
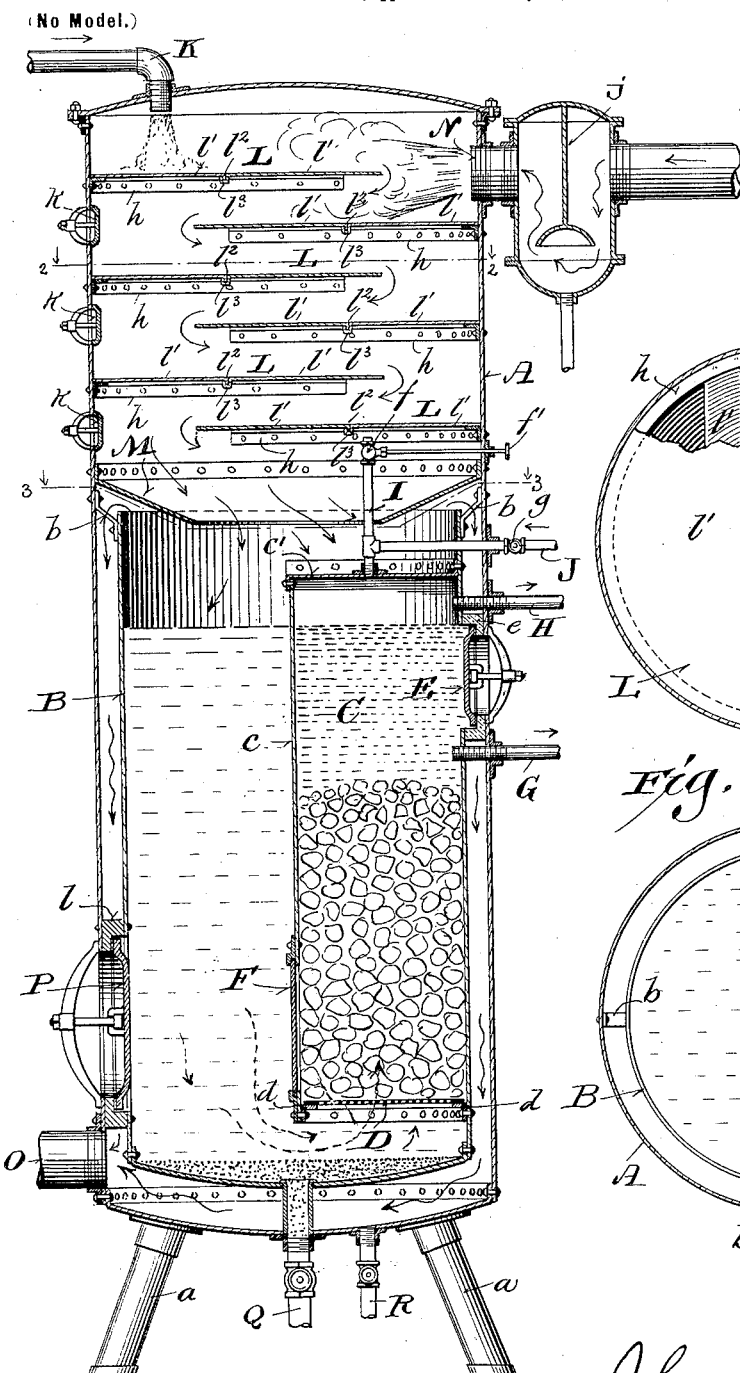
Figure 2:
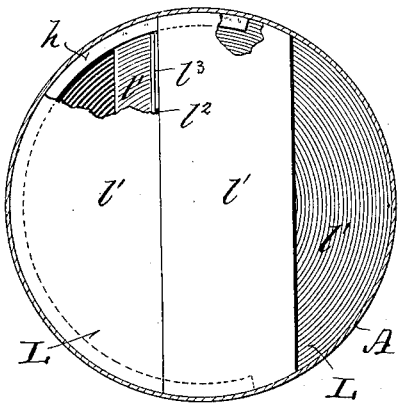
Figure 3:
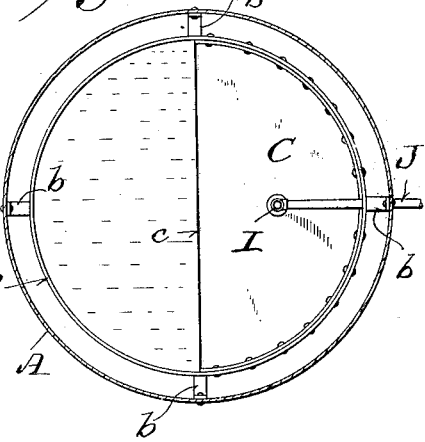

In the drawings, Figure 1 is a vertical central section of my improved device. Fig. 2 is a cross-section of the same on line 2 2 of Fig. 1; and Fig. 3 is a similar section on a lower plane, as indicated on line 3 3 of Fig. 1.

Referring by letter to the drawings, A represents a vertical closed outer shell supported upon legs $a$ $a$, and suspended therein by straps $b$ $b$ is a feed-water tank B, open at its top and of less diameter than the shell A, thereby forming a steam-space between the two and also between the bottom of the said shell and the tank B. A filter-chamber C is formed by a vertical partition $c$ in the feed-water tank having a closed top $c'$ and a perforation bottom D, that rests loosely upon an angle-iron frame $d$, which is sufficient distance from the bottom of the feed-water tank to allow free passage for the water to pass from the latter to the filter. This construction enables me to do all the filtering from the bottom, and I consider it quite an important feature of my invention, as it gives the sediment in the unfiltered water a chance to settle to the bottom of the feed-water tank, thus lightening the work upon the filter, which will consequently not clog or become foul so soon and will give a purer filtration. The upper part of the filter-chamber C is connected to the shell A by a ring $e$, which forms a seat for a manhole-cover E, whereby access is had to filter from the outside for the purpose of placing the filtering material therein and cleaning, and in the partition-wall $c$ I also provide a door F, through which the filter material may be taken out. G is a lead-pipe from the filter, through which the purified water is taken, and H is an overflow. I also provide a short vent-pipe I, that is tapped into the top of the filter and is normally open to the steam-pressure in the shell A for the purpose of equalizing the pressure upon the filtered water. A cock $f$ is placed at the top of this pipe, with its stem $f'$ extending through the shell A, and between said cock and filter is a branch pipe J, which extends outside of the shell and is provided with a suitable cock $g$. When it is desired to clean out the filter-chamber, the cock $f$ of pipe I is closed and steam is admitted through the pipe J to blow out the said chamber.

The shell A has its top preferably bolted thereto, and the water-supply pipe K by a suitable fitting is connected to the said top and discharges upon the first of a series of horizontal baffle-plates L, which are of the same diameter as the shell A, fitting snugly against the latter upon angle-iron ribs $h$. These plates are alternately cut away to form (as best shown in Fig. 2 of the drawings) a passage for the water, which passes over them in a thin sheet and finally falls upon a downwardly-inclined annular hood M, (which is riveted to the shell A,) and while serving as a guard to prevent the water passing down through the steam-space sheds the latter upon the top of the filter-chamber. Diametrically opposite the supply-pipe K and near the top of the shell A is the exhaust-steam-supply pipe N, which is provided with a suitable oil-extractor $j$, and, as shown, the steam and water come in contact as soon as they enter the feed-water heater, and the steam following the course of the baffle-plate passes downward, then under the hood N and between the feed-water tank and shell A, and out through the outlet-pipe O near the bottom of said shell.

Between the plates L, I provide hand-holes K, through which any substance that may accumulate upon the plates may be taken out.

The shell A, near its bottom, is connected to the feed-water tank by a ring $l$, which is normally closed by a manhole-cover P and through which the filter material may be removed, as may also the baffle-plates L. When it is desired to give the device a thorough cleaning, the baffle-plates for this reason are made in sections $j'\ j'$, as shown, their width being less than the greatest diameter of the ring $j$ and having one of their edges provided with downwardly-projecting flanges $j^2$ and the others with grooves $t^3\ t^3$, into which they lock and form a smooth continuous surface for the water to flow over.

A washout-pipe Q is provided at the bottom of tank B, and the shell A has the usual drain-pipe R.

The operation of a feed-water heater, condenser, and purifier of this class is so well known that I do not deem it necessary to go more fully into an explanation of it, but would particularly call attention to large area of heating-surface over which the water passes before it reaches the tank, due to my construction and arrangement of the baffle-plates and also to the fact that the water, when at its greatest heat and before passing into the tank, is deflected upon the top of the filter-chamber (which is additionally heated thereby) by the hood M and is then allowed to thoroughly settle before any filtration takes place and also that all parts which are liable to become foul are accessible and may be readily cleaned.

Having thus described my invention, what I claim as new, and desire to secure by Letters Patent, is—

In a feed-water heater, condenser and purifier, the vertical closed shell resting upon legs, an open tank suspended therein of less diameter than the said shell; a portion of said tank being partitioned off closed at its top and sides and open at its bottom to form a filter-chamber; a screen loosely fitted in said bottom a pipe extending from the top of said filter-chamber and normally open to steam-pressure in the closed shell; a downwardly-inclined circular hood fast to the wall of the aforesaid closed shell above the filter-chamber, and top of said open tank, baffle-plates horizontally disposed above the inclined annular hood, each of the baffle-plates being in two or more sections, locked together and resting upon ribs made fast to the vertical closed outer shell, an inlet water-pipe, and a steam-inlet above said baffle-plates; hand-holes interposed in the wall of the closed shell and between said baffle-plates, a steam-outlet near the bottom of said closed shell, and a man-hole connection between outer shell and the open tank, whereby the various loose parts in said feed-water heater, condenser and purifier may be easily removed, substantially as set forth.

In testimony that I claim the foregoing I have hereunto set my hand, at Milwaukee, in the county of Milwaukee and State of Wisconsin, in the presence of two witnesses.

JOHN MERTES.

Witnesses:
LIVINGSTON A. THOMPSON,
GEO. W. YOUNG.